US012723332B2

(12) United States Patent
Jones et al.

(10) Patent No.: US 12,723,332 B2
(45) Date of Patent: Sep. 1, 2026

(54) WOVEN STRUCTURE AND METHOD OF MANUFACTURE

(71) Applicant: ROLLS-ROYCE PLC, London (GB)

(72) Inventors: Christopher D Jones, Bristol (GB); Adam J Bishop, Bristol (GB); Sarvesh Dhiman, Loughborough (GB); Ian Buck, Derby (GB)

(73) Assignee: ROLLS-ROYCE plc, London (GB)

( * ) Notice: Subject to any disclaimer, the term of this patent is extended or adjusted under 35 U.S.C. 154(b) by 248 days.

(21) Appl. No.: 18/244,496

(22) Filed: Sep. 11, 2023

(65) Prior Publication Data

US 2024/0117533 A1 Apr. 11, 2024

(30) Foreign Application Priority Data

Oct. 6, 2022 (GB) ..................................... 2214661

(51) Int. Cl.
*D03D 11/00* (2006.01)
*B29C 70/22* (2006.01)

(52) U.S. Cl.
CPC ............ *D03D 11/00* (2013.01); *B29C 70/228* (2013.01); *D10B 2505/02* (2013.01)

(58) Field of Classification Search
CPC .... D03D 11/00; D03D 25/005; B29C 70/228; B29C 70/24; D10B 2403/033; D10B 2505/02

(Continued)

(56) References Cited

U.S. PATENT DOCUMENTS 7,101,154 B2 9/2006 Dambrine et al.
7,241,112 B2 7/2007 Dambrine et al.
(Continued)

FOREIGN PATENT DOCUMENTS

EP 2347889 A1 7/2011
WO 2020/192162 A1 10/2020

OTHER PUBLICATIONS

Mar. 27, 2023 Search Report issued in British Patent Application No. 2214661.7.

*Primary Examiner* — Camie S Thompson
(74) *Attorney, Agent, or Firm* — Oliff PLC

(57) ABSTRACT

A woven structure formed by warp and weft tows A, E of fiber reinforcement material includes: a plurality of multi-warp stacks $S_A$, each including a plurality of warp tows A which are in superposition along a longitudinal extent of the warp stack $S_A$, a plurality of multi-weft stacks $S_E$, each including a plurality of weft tows E which are in superposition along the stack $S_E$, wherein one or more multi-warp stacks $S_A$ and/or one or more multi-weft stacks $S_E$ has an embedded taper structure, including: an embedded tow $A_1$, $A_2$, $E_1$, $E_2$ which has a terminal portion $M_1$, $M_2$ disposed between two locally outermost tows $A_0$, $E_0$ of the respective stack $S_A$ $S_E$, the terminal portion $M_1$, $M_2$ terminating at a taper position $D_1$ $D_2$ along the respective path of the stack $S_A$ $S_E$; and a method for manufacturing a composite component.

17 Claims, 11 Drawing Sheets

(58) Field of Classification Search
USPC .......................................................... 442/205
See application file for complete search history.

(56) References Cited

U.S. PATENT DOCUMENTS

| | | | |
|---|---|---|---|
| 8,153,539 | B2 | 4/2012 | Coupe et al. |
| 8,426,326 | B2 | 4/2013 | Bouillon et al. |
| 8,499,450 | B2 | 8/2013 | Naik |
| 8,607,454 | B2 | 12/2013 | Blanchard et al. |
| 8,685,868 | B2 | 4/2014 | Bouillon et al. |
| 8,696,319 | B2 | 4/2014 | Naik |
| 8,846,147 | B2 | 9/2014 | Eberling-Fux et al. |
| 2011/0076431 | A1 | 3/2011 | Desjoyeaux |
| 2014/0334935 | A1 | 11/2014 | Dambrine et al. |
| 2019/0224885 | A1 | 7/2019 | Risicato et al. |

WOVEN STRUCTURE AND METHOD OF MANUFACTURE

This specification is based upon and claims the benefit of priority from UK Patent Application Number 2214661.7 filed on 6 Oct. 2022, the entire contents of which are incorporated herein by reference.

BACKGROUND

Technical Field of the Disclosure

The disclosure concerns woven structures and associated methods of manufacture, in particular woven structures comprising a multi-layer weave.

Background of the Disclosure

It is known to use composite materials comprising a matrix reinforced with fibre reinforcement material such as carbon fibre for components to provide a desirable combination of properties, such as strength and low weight.

Woven structures of fibre reinforcement material have been proposed for use in the manufacture of composite components, owing to improved properties relating to structural integrity. It is known to use multi-layer (or 3D) weaves, formed by weaving with multiple layers of warp yarn, for providing through-thickness structural integrity to a woven structure.

Looms can be used to make woven structures and can be controlled to separate respective sets of warp tows to define an opening for insertion of a weft tow between them. For example, a set of warp tows may be lifted to an upper side of the opening so as to pass over the weft tow, whereas another set may extend below the opening so as to pass under the weft tow. Automatic looms, which may be computer controlled, are known for creating diverse multi-weave structures. Typically, when manufacturing woven structures that are tapered in thickness, steps are formed on an external surface. Step regions may provide local pockets of potential matrix-rich areas. Steps may be reduced by applying external plies to the stepped surface but resin rich areas may remain.

SUMMARY OF THE DISCLOSURE

According to an aspect, there is described herein a woven structure formed by warp and weft tows of fiber reinforcement material, comprising: a plurality of warp stacks, each elongate along a path corresponding to a longitudinal direction of the woven structure; wherein the warp stacks are adjacent one another along a lateral direction of the woven structure, each warp stack comprising at least one warp tow which is elongate along the respective path; wherein one or more of the warp stacks is a multi-warp stack, each multi-warp stack comprising a plurality of warp tows which are in superposition along a longitudinal extent of the warp stack, thereby defining a superposed region of the multi-warp stack; a plurality of weft stacks, each elongate along a path transverse to the warp stacks; wherein the weft stacks are longitudinally-adjacent to each other, each weft stack comprising at least one weft tow which is elongate along the respective path; wherein a plurality of weft stacks are multi-weft stacks, each multi-weft stack comprising a plurality of weft tows which are in superposition along the stack, thereby defining a superposed region of the multi-weft stack; wherein the warp tows and weft tows of the respective stacks are woven in a multi-layer weave; wherein one or more multi-warp stacks and/or one or more multi-weft stacks has an embedded taper structure, the or each stack having the embedded taper structure comprising: an embedded tow which has a terminal portion disposed between two locally outermost tows of the respective stack in the superposed region, the terminal portion terminating at a taper position along the respective path of the stack; wherein the embedded tow has an end at the taper position; or wherein the terminal portion is adjacent to a lead-out portion of the embedded tow which extends past one of the locally outermost tows to exit the multi-layer weave for trimming. The woven structure may reduce the steps on the internal surface and the resultant matrix rich areas after the addition of matrix.

It may be that the lead-out portion of the embedded tow extends past one of the locally outermost tows and defines an end of the embedded tow.

Along the path of each multi-warp stack, two locally outermost tows of the stack may bind one or more weft tows of respective warp stacks therebetween, the number of weft tows bound between the two locally outermost tows at any position along the path of a multi-warp stack defining a binding number of the stack; and wherein along the path of each multi-weft stack, two locally outermost tows of the stack may bind one or more warp tows of respective weft stacks therebetween, the number of warp tows bound between the two locally outermost tows at any position along the path of a multi-weft stack defining a binding number of the stack.

For the or each stack having the embedded taper structure: the binding number of the stack may vary along the path of the respective stack local to the taper position.

Along the path of each warp stack there may be a plurality of transverse stack positions corresponding to intersections with the plurality of weft stacks; and wherein along the path of each weft stack there may be a plurality of transverse stack positions corresponding to intersections with the plurality of warp stacks.

For the or each stack having the embedded taper structure: the binding number of the stack may reduce along the path within two transverse stack positions of the taper position.

One or more of the stacks having the embedded taper structure may comprise a plurality of embedded tows with respective taper positions spaced apart along the path of the stack.

For the or each stack having the embedded taper structure, two tows of the respective stack may continuously define the locally outermost tows of the superposed region over a portion of the path which includes the or each taper position.

For the or each stack having the embedded taper structure, two tows of the respective stack may continuously define the locally outermost tows of the superposed region throughout the superposed region.

For the or each stack having the embedded taper structure, two tows of the respective stack may continuously define the locally outermost tows of the superposed region over the or each portion of the path in which the binding number of the stack reduces local to a taper position.

For the or each stack having the embedded taper structure, an embedded tow may have a depth number indicating the position of the terminal portion relative to a closest of the locally outermost tows, wherein a depth number of one indicates that the terminal portion is adjacent to the respective outermost tow; and wherein for one or more stacks having the embedded taper structure, there may be an embedded tow having a depth number of one; and/or wherein for one or more stacks having the embedded taper structure, there may be an embedded tow having a depth number of two or more.

The lead-out portion of the embedded tow may be at the same transverse stack position along the path as the taper position.

The woven structure may be a preform for a composite component, or a composite component.

According to an additional aspect, there is described herein a method for manufacturing a composite component, comprising: weaving a multi-layer woven preform for the component from warp and weft tows of fiber-reinforcement material, so that the woven preform comprises: a plurality of warp stacks, each elongate along a path corresponding to a longitudinal direction of the woven preform; wherein the warp stacks are adjacent one another along a lateral direction of the woven structure, each warp stack comprising at least one warp tow which is elongate along the respective path; wherein one or more of the warp stacks is a multi-warp stack, each multi-warp stack comprising a plurality of warp tows which are in superposition along a longitudinal extent of the warp stack, thereby defining a superposed region of the multi-warp stack; a plurality of weft stacks, each elongate along a path transverse to the warp stacks; wherein the weft stacks are longitudinally-adjacent to each other, each weft stack comprising at least one weft tow which is elongate along the respective path; wherein a plurality of weft stacks are multi-weft stacks, each multi-weft stack comprising a plurality of weft tows which are in superposition along the stack, thereby defining a superposed region of the multi-weft stack; wherein weaving the multi-layer woven preform comprises weaving the warp tows and the weft tows of the respective stacks in a multi-layer weave: wherein one or more multi-warp stacks and/or one or more multi-weft stacks has an embedded taper structure, the or each stack having the embedded taper structure comprising: an embedded tow which has a terminal portion disposed between two locally outermost tows of the respective stack in the superposed region, the terminal portion terminating at a taper position along the respective path of the stack; wherein the embedded tow has an end at the taper position; or wherein the terminal portion is adjacent to a lead-out portion of the embedded tow, and the weaving comprises controlling the lead-out portion to extend past one of the locally outermost tows to exit the multi-layer weave for trimming.

Controlling the lead-out portion of the embedded tow to exit from the embedded taper structure may comprise moving the lead-out portion of the embedded tow past one of the locally outermost tows.

Moving the lead-out portion of the embedded tow past one of the locally outermost tows may comprise crossing the embedded tow with the locally outermost tow in a reed space for the stack by raising or lowering the lead-out portion of the embedded tow.

Moving the lead-out portion of the embedded tow past one of the locally outermost tows may comprise controlling a rapier carrying the embedded tow to move the lead-out portion past the locally outermost tow.

The method may further comprise conducting a resin infusion operation on the woven preform; and/or conducting a forming operation to cure the woven preform; so that the tows may be embedded in a composite matrix.

In a further aspect, there is described a non-transitory computer-readable medium comprising instructions which, when executed by a processor, are configured to cause a performance of a method in accordance with any of the above aspects.

In a yet further aspect, there is described a non-transitory computer-readable medium comprising model data for a woven structure as defined in any of the above aspects.

BRIEF DESCRIPTION OF THE DRAWINGS

Embodiments will now be described, by way of example only, with reference to the accompanying drawings, which are purely schematic and not to scale, and in which.

DETAILED DISCUSSION OF THE DISCLOSURE

Figure 1A:
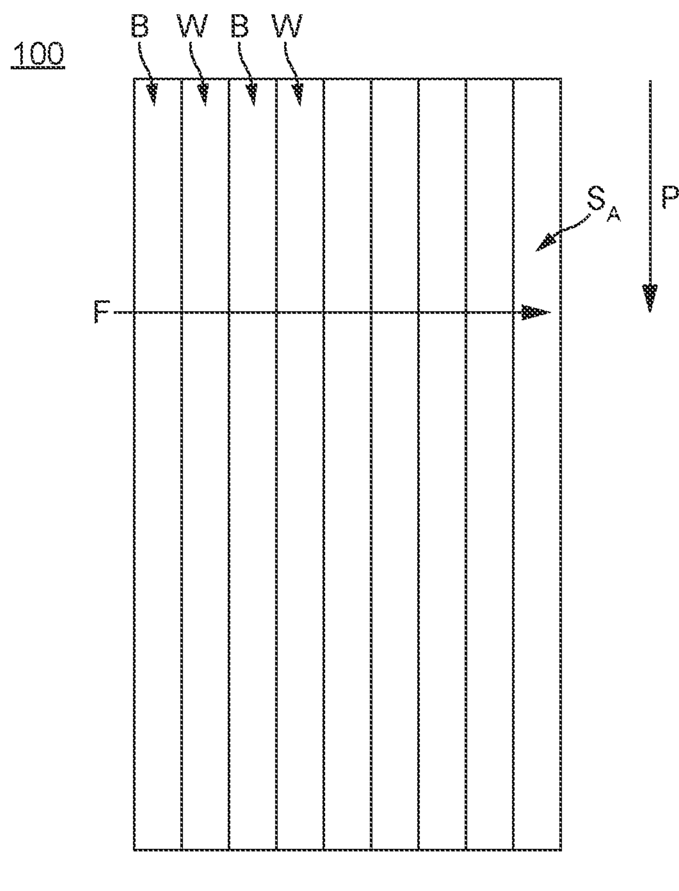
FIGS. 1*a*-1*c* and 2 schematically show views of an example woven structure.

The expression "tow" as used herein refers to a bundle of fibre reinforcement material. In the context of a woven preform or woven structure, the tow is the smallest element of the weave structure to be manipulated to form the weave (as the individual fibres are not manipulated independently of each other). The tow weight as described herein may be characterized by the weight per unit length or by the number of fibers. The tow weight may be variable or may be constant between tows.

A woven preform as described herein is an intermediate product in a composite manufacturing process, for subsequent forming into a near net shape for the component by resin infusion (e.g., resin transfer moulding) and curing etc. The woven preform may be "pre-preg" (i.e., may comprise pre-impregnated fiber reinforcement material).

A woven structure as described herein encompasses both a woven preform and a formed component having a corresponding woven structure. In this disclosure, all examples of a composite component comprise a woven structure. The expression "component" implies that the woven structure has been formed to the near net shape for the component (and/or finished to adopt the net shape of the component). Net shape is the intended geometry of the component, and is a term of the art.

A composite component comprising a woven structure as described herein may be provided, based on a woven preform, by any suitable method. Example methods include a resin transfer moulding (RTM) process in which a matrix material (such as an epoxy resin or any other suitable matrix material as are known in the art) is infused in the woven structure to provide a composite component of matrix material and fibre-reinforcement material.

As is known in the art, different weaves (i.e., different weave patterns or designs) can be used to achieve different properties of a woven structure. For example, weaves with relatively more interlacing between warp and weft tows may generally be more stable and less compliant to adopt different shapes, whereas weaves with relatively less interlacing between warp and weft tows may generally be less stable and more compliant. Such interlacing tends to result in crimping of tows as they pass under or over the respective other tow, and each crimping location may increase a resistance to relative movement between tows (e.g., by elevated friction). As a simple example, "satin" weaves have a relatively high float number (the number of tows of one type over which a tow of the other type extends between interlacing or crimping locations) compared to some other weave types such as a plain weave. Such "satin" weaves therefore have a reduced stability and are more compliant, and are known in the textile industry to provide an improved drape (i.e., being compliant to conform easily to a shape). Similar concepts apply to more complex structural weaves, including multi-layer weaves. While the expression "stability" is used in the relevant art to refer to the compliance of a weave structure, for the purposes of this disclosure it may be considered to be interchangeable or equivalent to a stiffness or flexural rigidity (as may be assessed by reference to a flexural modulus or bending modulus of elasticity).

In a multi-layer weave, there are generally multiple layers of weft tows extending along a weft direction and layered in a thickness direction of the weave, with warp tows extending along a substantially orthogonal warp direction at respective locations along the weft direction.

Figure 1B:
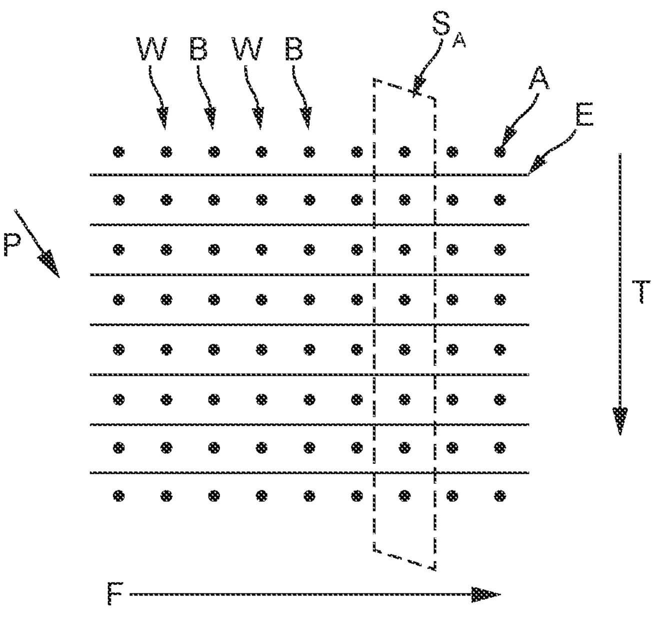

To aid the further discussion of multi-layer weaves, selected weave terminology is discussed below with reference to FIG. 1 (comprising FIGS. 1*a*-1*c*). FIG. 1*a* shows an example multi-layer woven structure 100 comprising a plurality of warp stacks $S_A$ which extend along a longitudinal direction P and each have a notional width along a weft direction F, each stack $S_A$ having one or more warp tows A (as shown in FIG. 1*b*) which extend along the longitudinal direction within the respective stack (in superposition if there are multiple warp tows).

The longitudinal direction may be interchangeably referred to as a warp direction in the present disclosure. The lateral direction may be interchangeably referred to as a weft direction in the present disclosure. FIG. 1*b* shows a cross-sectional slice of the woven structure 100 normal to the warp direction P at a longitudinal position, and shows that the woven structure 100 further comprises a plurality of weft tows E extending along a weft direction F. The weft tows E are layered in a thickness direction T of the weave, and in this example are provided in a plurality of weft tow layers, each weft tow layer comprising an array of weft tows distributed along the longitudinal direction of the weave so that respective tows are in superposition at respective longitudinal positions. As will be discussed in greater detail below with reference to FIG. 2, at each location along the warp direction P there are corresponding weft stacks $S_E$.

Each location along the weft direction F occupied by one or more warp tows A superposed on each other through the thickness direction T is referred to herein and in the art as a warp "stack" $S_A$, such that there are a plurality of stacks $S_A$ defined along the weft direction F by respective sets of one or more warp tows A. A suitable configuration of warp stacks $S_A$ in a multi-layer weave is to provide an alternating arrangement of warp (or non-binding) stacks W and binding stacks B, with binding stacks B being stacks in which the or each warp tow A is interlaced with weft tows E (i.e. moving between layers of weft tows, or moving between warp tow positions defined between such layers) to bind the weft tows E, whereas warp (or non-binding) stacks W are stacks in which the or each warp tow A extends without interlacing with weft tows E (e.g. remaining between the same two layers of weft tows E, or remaining at the same warp tow position).

Figure 1C:
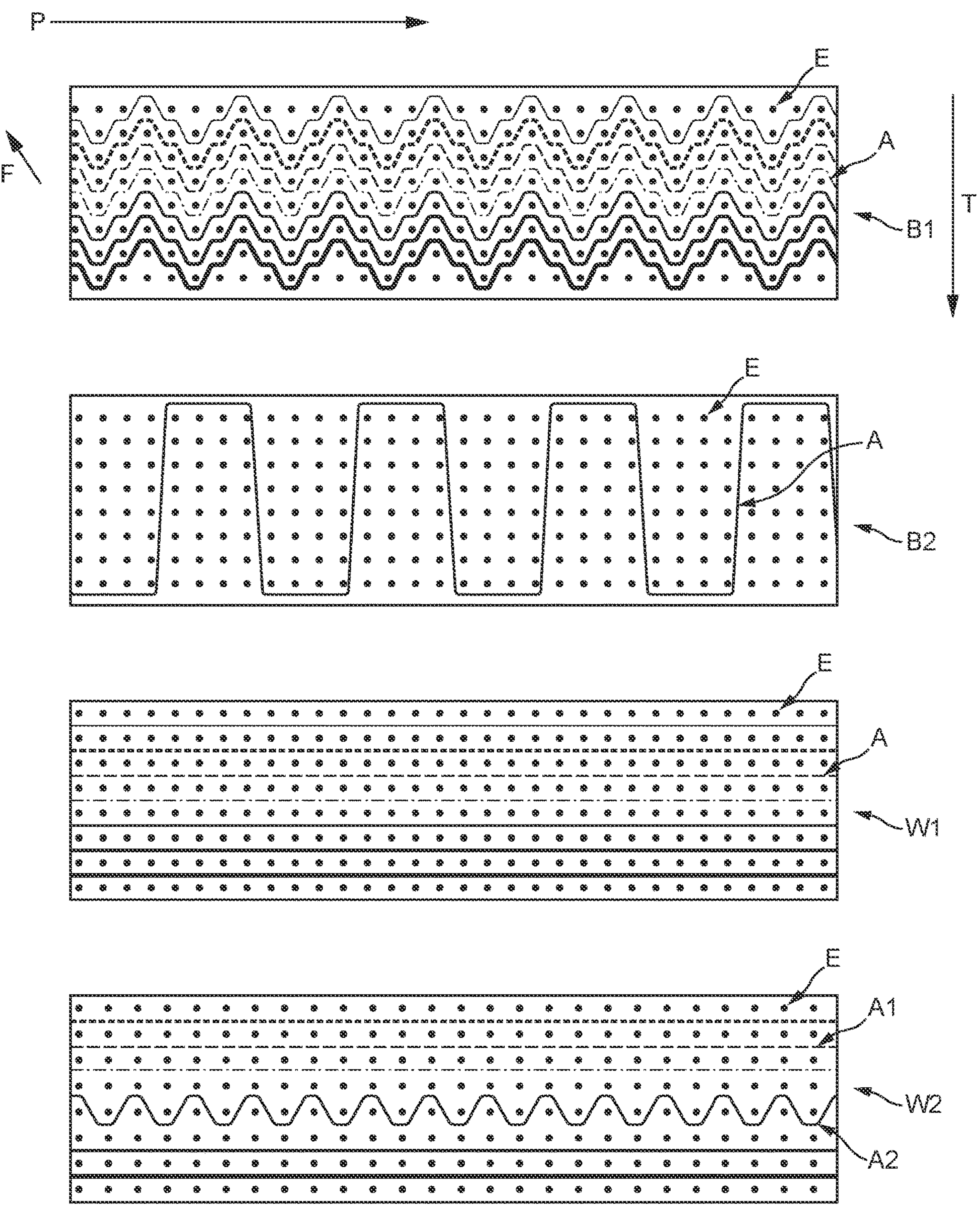

As shown in FIG. 1*c*, in a multi-layer weave the interlacing of weft tows E means that along the longitudinal direction, the position of each warp tow A moves between weft tow layers. Accordingly, at any particular longitudinal position the upper and/or lower warp tows A may not extend over (i.e. on an outer side of) the uppermost or lowermost weft tow E respectively. This is manifested in FIG. 1*c*, which shows a pattern of unoccupied gaps for warp tows A in binding stacks $B_1$ and $B_2$, corresponding to a weave pattern for the binding stacks as will be further described below.

Various stack arrangements are shown in FIG. 1*c*, each of which show cross-sectional slices of the woven structure 100 normal to the weft direction F at lateral positions along the weft direction F (which extends into the page). In order, there is shown a first binding example stack $B_1$, a second example binding stack $B_2$, a first example warp (or non-binding) stack $W_1$, and a second example warp stack $W_2$.

In the binding stacks $B_1$ and $B_2$, one or more warp tows A extend through the thickness direction T of the woven structure between opposing sides to define a multi-layer weave pattern. In the first binding stack $B_1$, the multi-layer weave type is a layer-to-layer angle interlock weave comprising seven binding warp tows A which extend through eight weft tow layers E. In the second binding stack $B_2$, the multi-layer weave type is an orthogonal through-thickness weave having a float number of four, meaning that the (single) binding warp tow A extends through the thickness (in this example eight layers of weft tows E) in the thickness direction T of the woven structure, and passes in the warp direction P over four weft tows E before returning. A further example of a through-thickness weave (comprising a single binding warp tow) is a through-thickness angle interlock weave, as is known in the art.

In contrast, in the first example warp stack $W_1$, the warp tows A extend along the warp direction P at constant warp tow positions with respect to the thickness direction T of the weave (i.e., each warp tow position being a position defined between adjacent weft tow layers). As such, there is no binding between the warp A and weft tows E, and the stack may be termed a "non-binding" stack.

In the second example warp stack $W_2$, the warp tows A are generally arranged as in the first warp stack $W_1$, with the exception of a centrally-located warp tow $A_2$ which is interlaced between two adjacent warp tow positions. Nevertheless, this warp tow does not act to bind two adjacent weft tow layers together, and so may be considered to be non-binding. In the present disclosure, a stack in which a majority of the warp tows are non-binding may be considered a non-binding stack.

Figure 2:
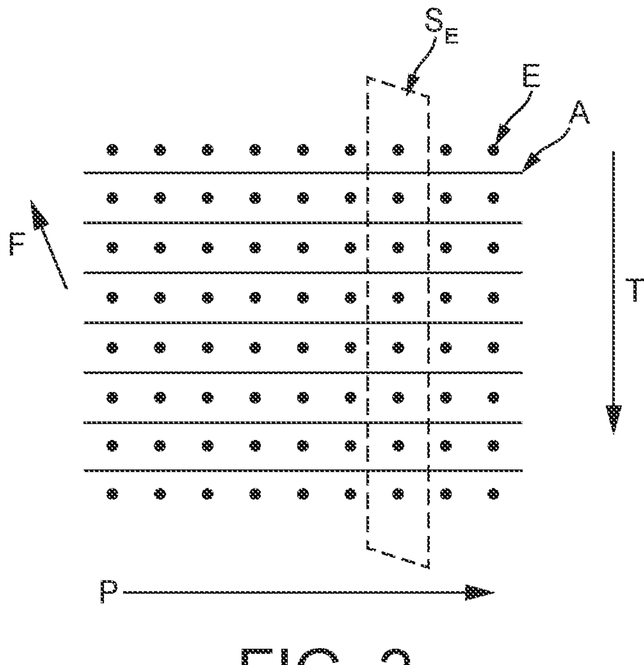

In this disclosure, corresponding "stack" terminology is used to refer to the arrangement of the weft tows E. FIG. 2 shows a cross-sectional slice of the woven structure normal to the weft direction F (which points into the page of FIG. 2), and shows the plurality of warp tows A extending along a warp direction P. Each location along the warp direction P occupied by one or more weft tows E superposed on each other through the thickness direction T is referred to herein as a weft stack $S_E$, such that there are a plurality of stacks $S_E$ defined along the warp direction P by respective sets of one or more weft tows E.

A plurality of weft stacks $S_E$ extend along the weft direction F. Each stack $S_E$ has a notional width along a warp direction P, each stack $S_E$ having one or more weft tows E which extend along the weft direction F within the respective stack $S_E$ (e.g., in superposition if there are multiple weft tows E).

An example apparatus which may be used for manufacturing a woven structure as disclosed herein comprises a warp tow supply and a loom. The warp tow supply is configured to supply warp tows A to the loom for weaving with weft tows E at a weave location of the loom. The warp tow supply may comprise a plurality of separate tow supply feeds (e.g., separate tow spools on a creel) each configured to independently supply separate warp tows A to the weave location of the loom.

The loom is configured to weave a woven structure, at a weaving location of the loom, using the warp tows A supplied in a longitudinal direction (corresponding to the warp direction P) from the warp tow supply and weft tows E supplied along a generally transverse direction (corresponding to a weft direction F) at the loom (from a corresponding weft tow supply). The loom may be of any suitable type as is known in the art, suitable for weaving a multi-layer woven structure. The loom may comprise a reed used to space the warp threads and a rapier to carry the weft threads. For complex weaves the loom may be programmable (i.e., configured for computer control) to form woven structures with weave patterns based on computer-readable instructions. Such a loom may be referred to as a computer-controlled jacquard loom. The apparatus comprises a loom controller for controlling the loom to weave the woven structure.

As is known in the art, a loom can be controlled to separate respective sets of warp tows A to define an opening for insertion of a weft tow E between them. For example, a set of warp tows A may be lifted to an upper side of the opening so as to pass over the weft tow E, whereas another set may extend below the opening so as to pass under the weft tow E. After insertion of the weft tow E, the same or different sets of warp tows A can then be repositioned to define another opening for reception of a weft tow E.

The woven structure produced by the loom may be referred to herein as a woven preform to reflect that it forms an integral part of the component, but must be formed to shape and subsequently cured with matrix material (e.g., by a resin transfer moulding (RTM) technique) to form the component.

The woven preform may be referred to herein as having a longitudinal direction P corresponding to the path along which it is discharged from the loom, and a lateral direction F orthogonal to the longitudinal direction P and extending across the woven preform. The longitudinal direction may correspond to the warp direction P of the woven preform (i.e., along which warp tows generally extend). The lateral direction may generally correspond to a weft direction F of the woven preform, while acknowledging that weft tows E may depart from a direction that is precisely orthogonal to the longitudinal and/or warp directions. The weft tows E are interwoven with warp tows A at multiple lateral positions along the weft tows E.

An example component comprising a woven structure as envisaged in this disclosure is an aerospace component such as a component of a gas turbine engine, for example a stator vane and/or stator vane segment. It will be appreciated that the disclosure herein may be applicable to other gas turbine engine and aerospace components, or other components in other fields.

It will be appreciated that a woven structure as described herein is implemented by providing a woven preform which may then be wholly or substantially maintained in a composite component comprising the woven preform and a matrix material (considering that trimming processes may be applied to the woven preform), and as such the following description is with reference to a woven structure per se, rather than with reference to a particular stage of manufacture.

Depending upon the component which is to be manufactured, it may be desirable to produce a woven structure that is tapered in thickness (i.e., if a component is to be tapered in thickness). Examples of such components in the field of gas turbines include aerofoil shaped components such as a stator vane, fan blades and/or outlet guide vanes, together with non-aerofoil shaped components such as structural frames.

Figure 3:
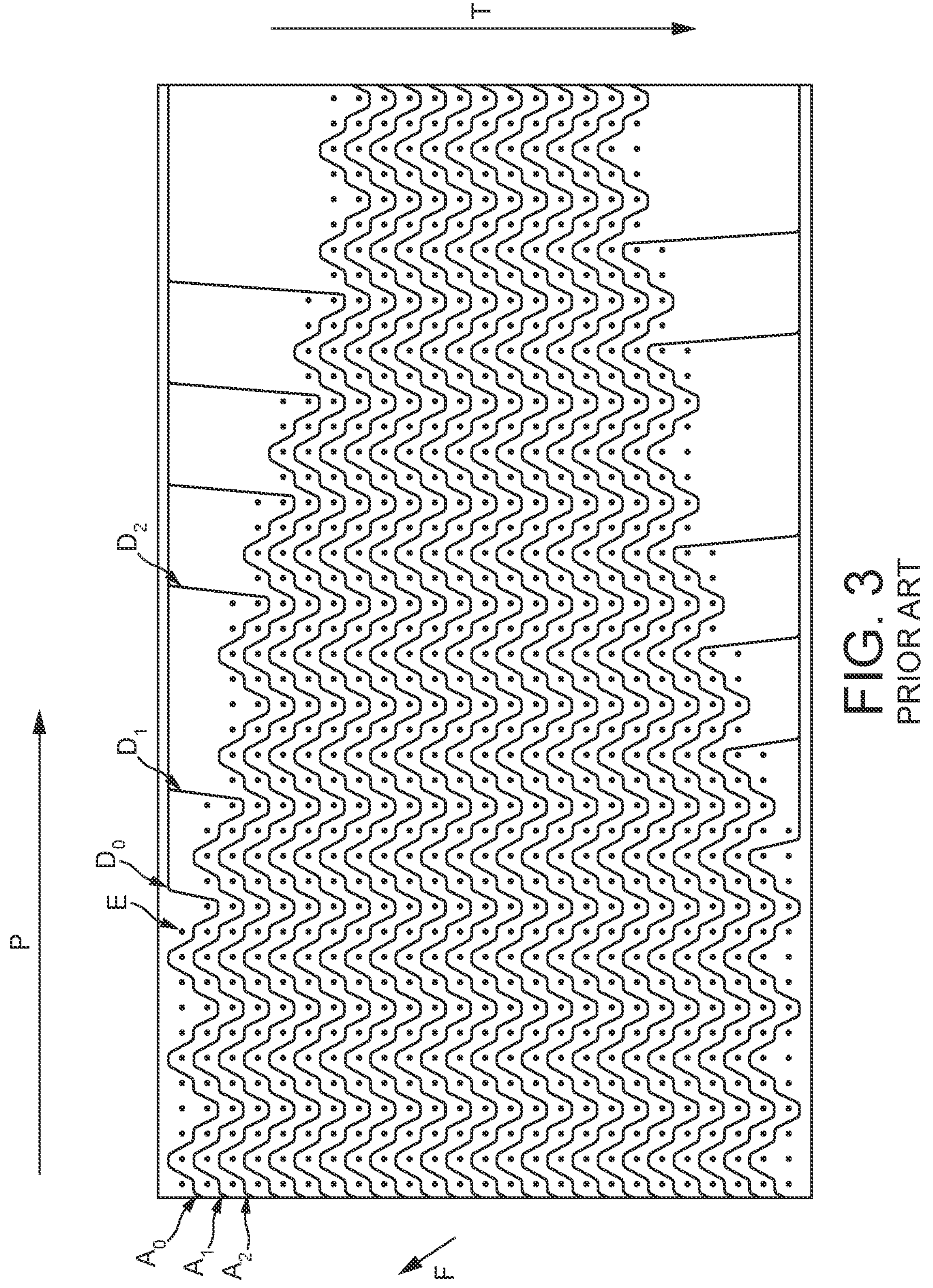
FIG. 3 schematically shows an example woven structure of the prior art.

A tapered woven structure is shown in FIG. 3, which shows a cross-sectional slice normal to a weft direction F (and thereby having an extent in a longitudinal direction P and a thickness direction T). The woven structure comprises a plurality of tows arranged in a stack. In this example, the tows are warp tows A and the stack S is a multi warp stack $S_A$.

The plurality of tows comprise at least tows $A_0$, $A_1$, $A_2$ (e.g., $A_0$ to $A_n$) superposed in the thickness direction T. In this example, the tows $A_0$, $A_1$, $A_2$ (e.g., $A_0$ to $A_n$) are arranged in a layer-to-layer angle interlock weave.

In this example, the thickness of the woven structure reduces along the warp direction P, by reducing the number of tows in the woven structure. As can be seen in FIG. 3, the topmost tow $A_0$ exits the woven structure at point $D_0$, the second tow $A_1$ exits the woven structure at $D_1$, and the third tow $A_2$ exits the woven structure at $D_2$, etc, until the desired taper is achieved. The expression "exit" as used herein relates to a tow departing from a bound portion of the woven structure in which weft and warp tows are interlaced. Due to the exiting of these tows at points $D_0$, $D_1$ and $D_2$ (and subsequent tows), the external surface has a stepped structure. During forming of the woven structure into shape and curing with matrix material, the matrix material concentrates in the steps on the surface and provides local pockets of resin rich areas. External plies or tows may be added to the stepped areas, for example before a matrix material is added, but nevertheless matrix rich areas may remain.

Figure 4A:
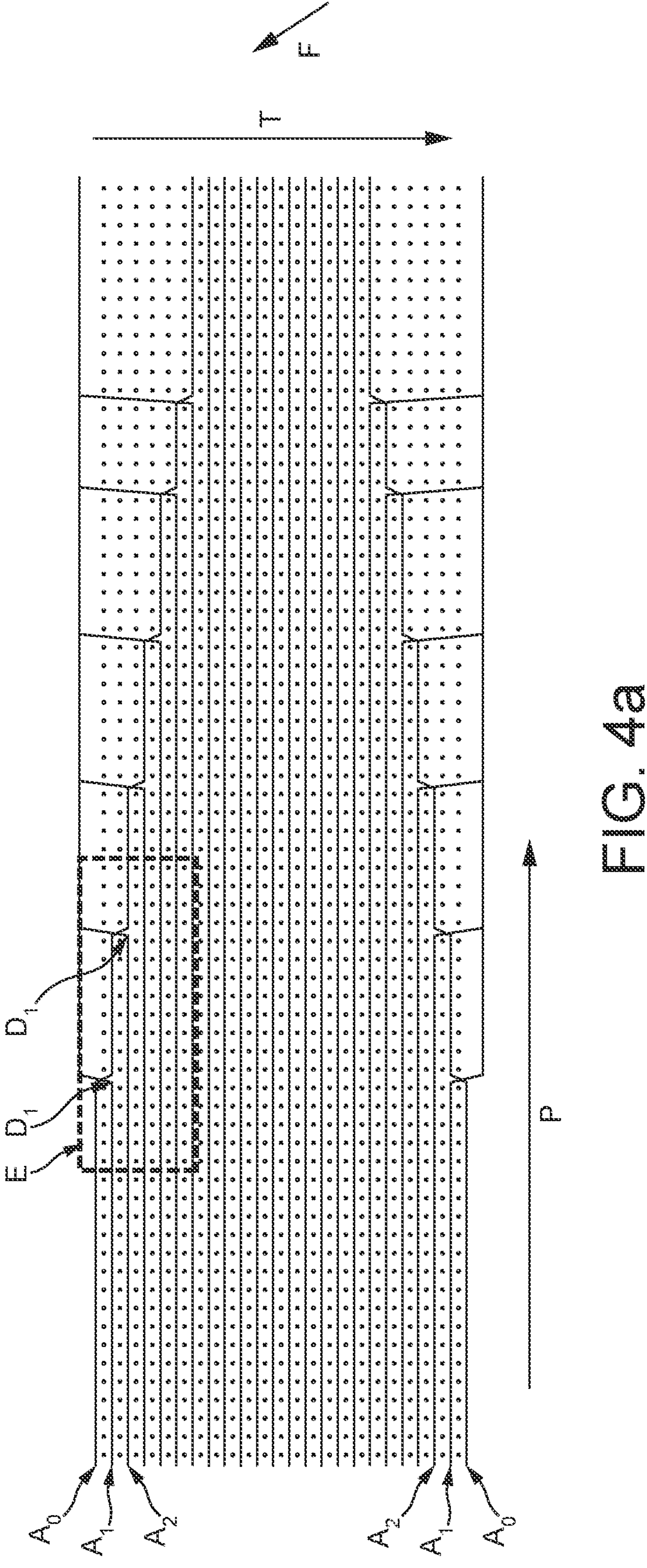
FIGS. 4*a*-4*c* schematically show regions of an example woven structure.

FIG. 4a shows an example non-binding stack in accordance with the disclosure. FIG. 4a shows a cross-sectional view normal to a weft direction F of the woven structure at a selected warp stack $S_A$. Although the following example is disclosed with reference to a warp stack, it will be appreciated that the same principles apply to a corresponding weft stack $S_E$.

As shown in FIG. 4a, the warp stack $S_A$ is a multi-warp stack. Each multi-warp stack $S_A$ comprises a plurality of warp tows $A_0$, $A_1$, $A_2$ which are in superposition along a longitudinal extent P of the warp stack $S_A$, thereby defining a superposed region of the multi-warp stack $S_A$. The warp tows A are each elongate along a path corresponding to a longitudinal direction P of the woven structure. Along the path of each warp stack $S_A$ there is a plurality of transverse stack positions corresponding to intersections with the plurality of weft stacks $S_E$. Although only one stack S is shown here, it will be appreciated that there may be a plurality of adjacent stacks S (as shown in FIG. 1) and that the or each stack S may have an embedded taper structure and weave pattern as will be described below.

At each longitudinal position along a multi-warp stack $S_A$, there are two locally outermost warp tows which bind one or more weft tows E therebetween in the superposed region. The expression "bind" is used in this context to refer to weft tows E of the multi-layer weave being disposed between the locally outermost tows. The number of weft tows E bound between the two locally outermost tows $A_0$ at any position along the multi-warp stack $S_A$ defines a binding number of the stack S. The term "locally outermost" refers to the outermost tows for a given position along the path of the tow. For instance, in FIG. 4*a*, the locally outermost warp tows for each "column" (i.e., longitudinal or warp position P) are the upper and lower tows marked by $A_0$. It will be appreciated that for a corresponding weft stack $S_E$, there are corresponding locally outermost weft tows for each lateral or weft position P along the path of the weft tow. In this example, the same warp tows $A_0$ form the locally outermost tows along the extent of the stack, despite a tapering profile of the multi-layer weave, but in other examples warp tows may change position within the weave, such that different tows form the locally outermost tow at respective longitudinal positions.

In addition to the locally outermost tows $A_0$, the plurality of warp tows A includes a plurality of embedded tows $A_1$, $A_2$, etc (e.g., $A_1$ to $A_n$). Each embedded tow $A_1$, $A_2$ can be defined as having a tow number which indicates the position of the tow relative to a closest of the locally outermost tows $A_0$ at any given position along the warp direction (i.e., a closest of the upper and lower outermost tows $A_0$) as shown in FIG. 4*a*. For instance, the embedded tow marked as $A_1$ in FIG. 4*b* has a tow number of one and is adjacent to the upper outermost tow $A_0$. It will be appreciated that the two tows marked as $A_0$ in FIG. 4*a* both have tow numbers of zero. It will be appreciated that an embedded tow may swap in positions over the path of the stack $S_A$ (thereby changing in tow number at different positions along the path), for example by causing respective embedded tows to pass each other in a reed space of a loom or weaving machine, as controlled by separately controlling the position of the respective embedded tows relative to one or more weft tows.

The example multi-warp stack of FIG. 4*a* has an embedded taper structure. In the embedded taper structure, the thickness of the woven structure reduces along the warp direction P. The thickness is reduced along the warp direction P by virtue of one or more embedded (or internal) tows $A_1$ $A_2$ exiting from the multi-layer weave at respective taper positions $D_1$, $D_2$. Although FIG. 4*a* shows the respective tows $A_1$, $A_2$ being disposed at the upper and lower sides of the stack, downstream of their respective taper positions $D_1$, $D_2$, these exited tows serve no binding function in the stack and are intended for trimming. The boundaries of the multi-layer weave correspond to a trim boundary for the component. In the examples of FIG. 4*a*, the trim boundary effectively corresponds to the profile of the outermost tows $A_0$ and so the trim boundary is not explicitly shown on the drawing (in other examples, such as the example of FIG. 6, a separate trim boundary 50 is shown). The exiting tows and any weft tows outside of this trim boundary are subsequently trimmed. In this way, the binding number of the stack $S_A$ reduces along the warp direction P, and this change in binding number takes place local to the taper position D. For instance, the binding number of the stack S may reduce along the path within two transverse stack positions of the taper position D.

By causing embedded tows to exit, the thickness of the multi-layer weave can be reduced while retaining the same two locally outermost tows $A_0$ of the stack $S_A$ local to the taper position. In particular, the same two tows $A_0$ continuously define the locally outermost tows of the superposed region of the stack over a portion of the path (e.g., the longitudinal path) which includes the respective taper position D. In this way, a smoother outer surface of the tapered woven structure is formed, which may minimise matrix-rich regions on addition of the matrix.

In some examples, including the example of FIG. 4*a*, the same two tows $A_0$ of the respective stack $S_A$ continuously define the locally outermost tows of the superposed region throughout the superposed region (e.g., throughout the extent of the multi-layer weave which has multiple respective tows in superposition). However, this is optional and the disclosure envisages the advantages relating to providing a smooth outer surface of the woven structure to arise when, for the or each taper position D, two respective tows $A_0$ of the respective stack $S_A$ continuously define the locally outermost tows of the superposed region over the respective portion of the path in which the binding number of the stack reduces local to the taper position D.

As can be seen from FIG. 4*a*, in this example, embedded tows $A_1$, $A_2$ exit the structure on both the upper and lower side. However, in variant examples, the embedded tows $A_1$, $A_2$ may only exit on one side. The exiting of the tows $A_1$, $A_2$ from the structure will now be described in more detail with reference to FIG. 4*b*, which is a close-up of the section shown in dashed lines in FIG. 4*a*.

The embedded tow $A_1$ has a terminal portion $M_1$ which is between the two locally outermost tows $A_0$ of the respective stack $S_A$ in the superposed region. The terminal portion $M_1$ terminates at a taper position $D_1$ along the path of the stack $S_A$. In the example shown in FIG. 4*b*, the terminal portion $M_1$ is adjacent to a lead-out portion $L_1$ of the embedded tow $A_1$. The lead-out portion $L_1$ extends past a locally outermost tow $A_0$ to exit the multi-layer weave for trimming. A similar terminal portion $M_2$ and lead-out portion $L_2$ are shown for embedded tow $A_2$. In some weave structures, the terminal position $M_1$ may define an end of the respective tow, for example after a respective lead-out portion $L_1$ has been trimmed. It is envisaged that a significant lead-out portion $L_1$ may be provided during weaving of a woven preform, but that subsequent trimming either removes the lead-out portion $L_1$ or significantly reduces its extent, such that the end of the respective tow is either defined at the terminal portion $M_1$ within the weave structure, or at the end of a shortened lead-out portion $L_1$. A shortened lead-out portion $L_1$ may be drawn back into the weave structure (e.g., within the region between the locally outermost tows $A_0$) during a subsequent forming operation.

Figure 4B:
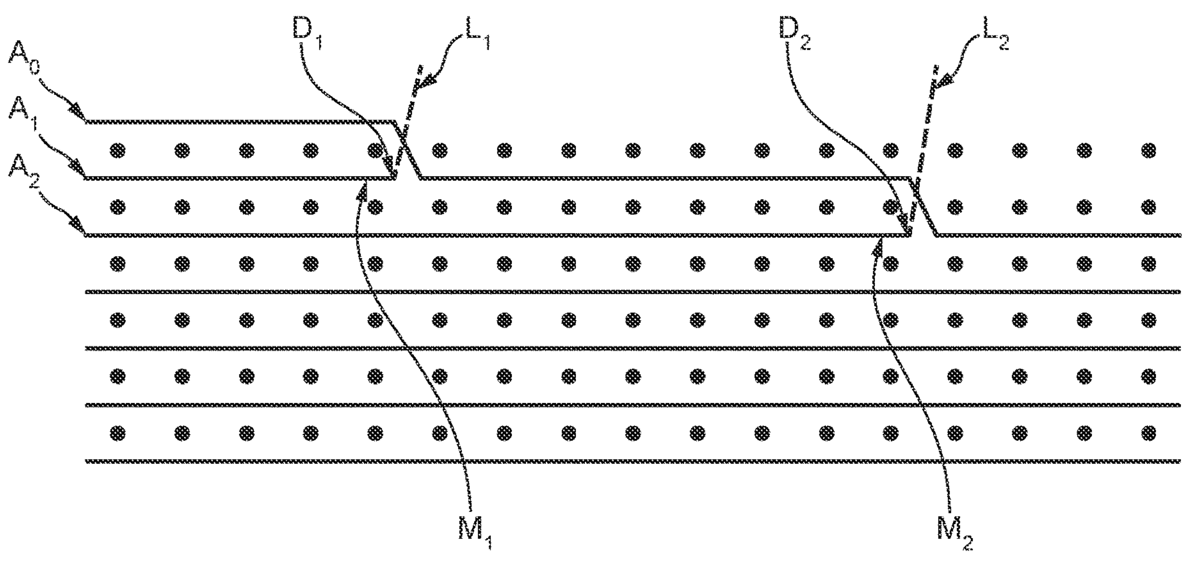

As shown in FIGS. 4*a* and 4*b*, the embedded taper structure comprises a plurality of embedded tows $A_1$, $A_2$ with respective taper positions $D_1$, $D_2$ spaced apart along the path of the stack $S_A$ In this example, the lead-out portion of each embedded tow $L_1$, $L_2$ is at the same transverse stack position along the path as the respective taper position $D_1$, $D_2$. In the context of a multi-warp stack, this means that the respective lead-out portion does not extent longitudinally past any further weft tows beyond the taper position. In other examples, the lead-out portion L of the embedded tow A may extend further along the path than the taper position D, such that it passes further transverse stack positions before exiting the embedded taper structure.

Figure 4C:
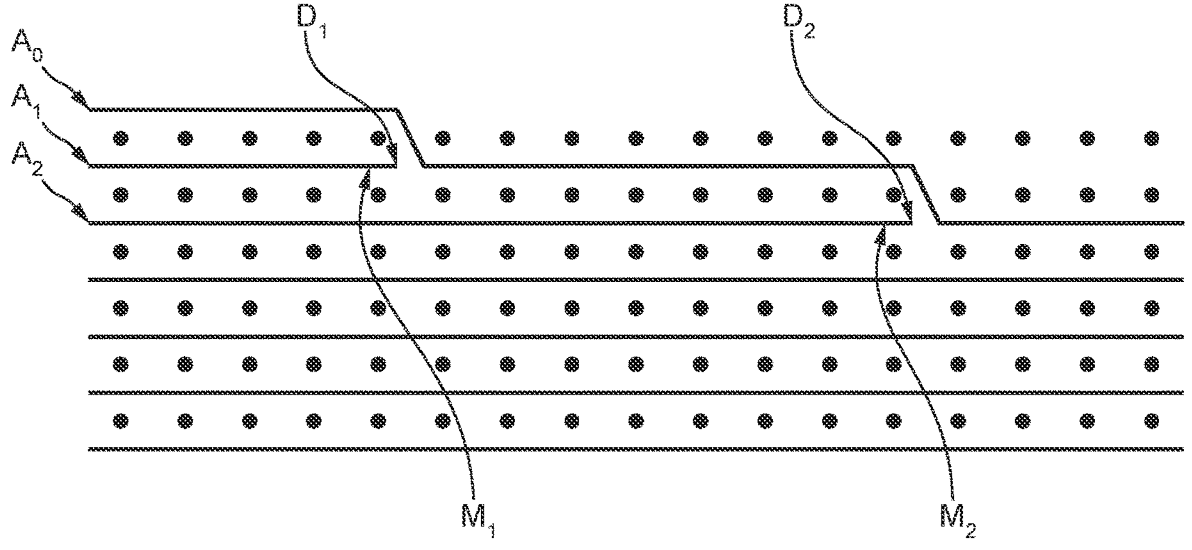

In other examples, as shown in FIG. 4*c*, there may be no lead-out portion L and the embedded tow (or tows) may have an end at the taper position $D_1$.

Each terminal portion M can be defined as having a depth number which indicates the position of the terminal portion M relative to a closest of the locally outermost tows $A_0$ (i.e., a closest of the upper and lower outermost tows $A_0$) as shown in FIG. 4*a*. The depth number is similar to the tow number as described for each tow, but for the terminal portion M in particular, since the tow number can vary along the length of the tow A depending upon the weave pattern as discussed above. For instance, the terminal portion marked as $M_1$ in FIGS. 4*b* and 4*c* has a depth number of one and is adjacent to the upper outermost tow $A_0$. The terminal portion marked as $M_2$ in FIGS. 4*b* and 4*c* also has a depth number of one as it is adjacent to the top outermost tow $A_0$.

In other examples, the terminal portion M of an embedded tow may have a depth number of two or more. In other words, the respective tow may not be directly adjacent to the locally outermost tow $A_0$ at the respective taper position D at which it ends or extends along a lead-out portion to exit the multi-layer weave.

Figure 5A:
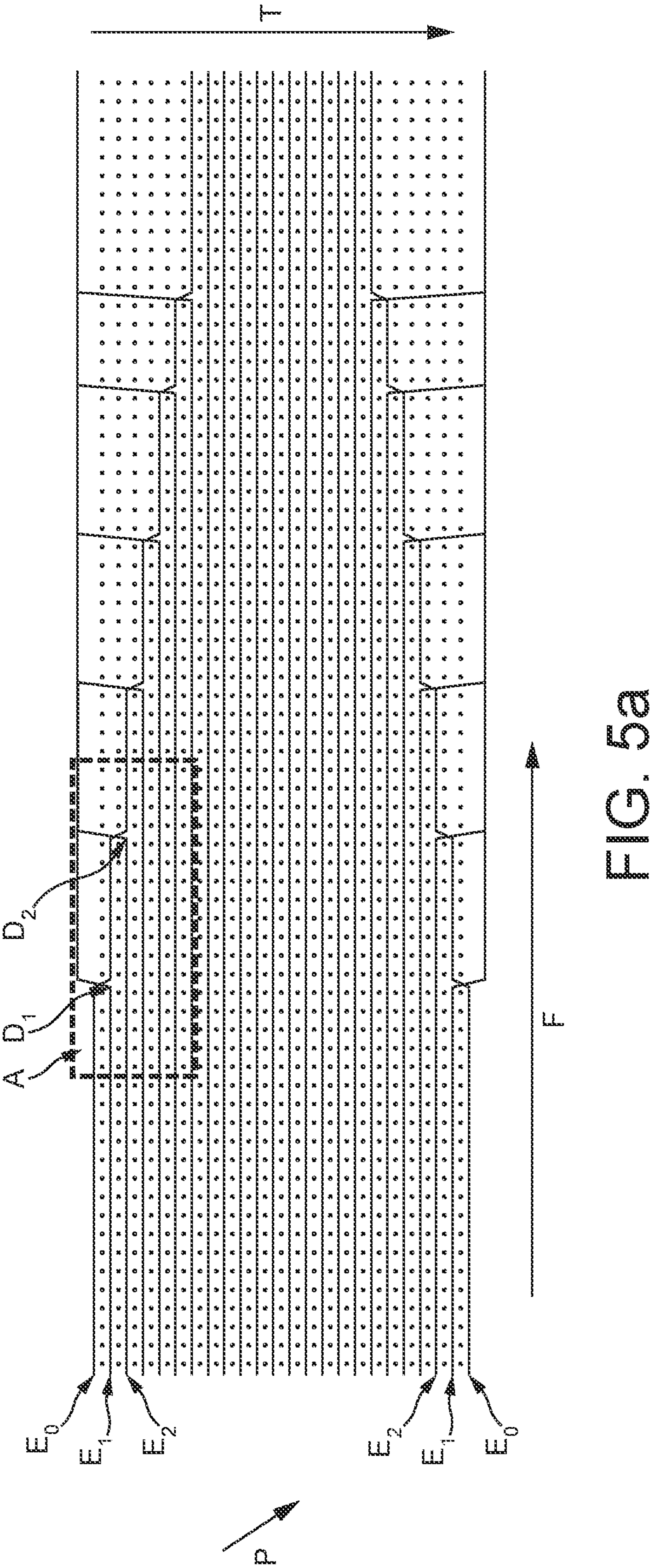
FIGS. 5*a* and 5*b* schematically show regions of an example woven structure.
Figure 5B:
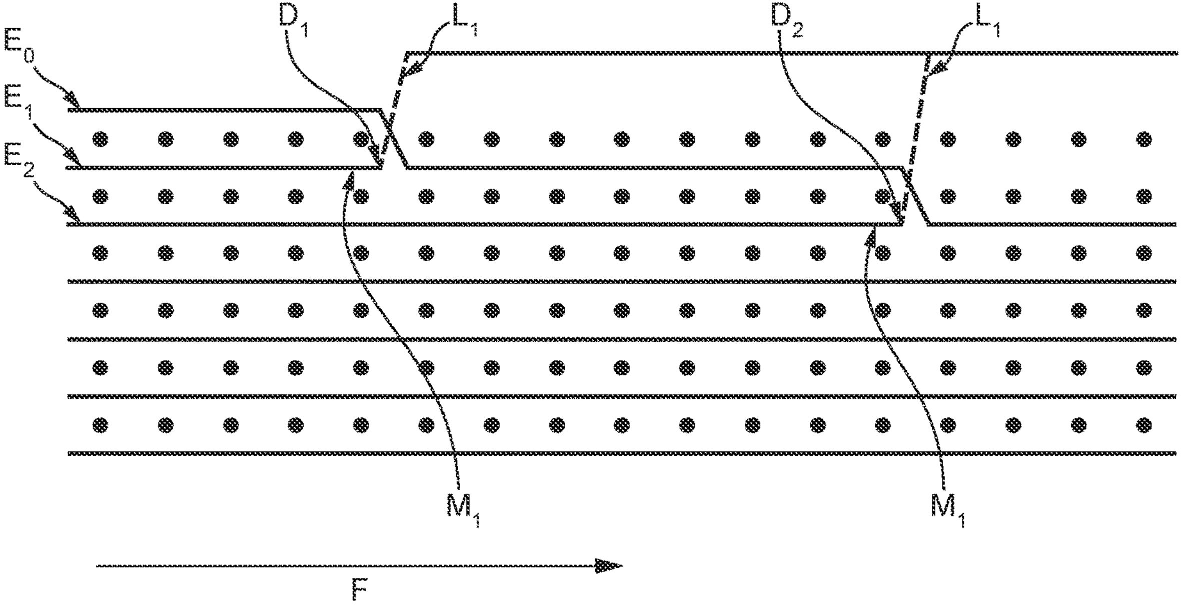

Although the stacks S of FIGS. 4*a*-4*c* have been described in relation to warp stacks $S_A$, it will be appreciated that similar principles of embedded taper structures apply to weft stacks $S_E$, as shown in FIGS. 5*a* and 5*b*. In FIGS. 5*a* and 5*b*, there is shown an example multi-weft stack $S_E$ comprising a plurality of weft tows $E_0$, $E_1$, $E_2$ which are in superposition along the stack $S_E$, thereby defining a superposed region of the multi-weft stack $S_E$. Along the path of each multi-weft stack $S_E$ (i.e. in the weft direction F), two locally outermost tows $E_0$ of the stack $S_E$ bind one or more warp tows A of respective weft stacks therebetween. The number of warp tows A bound between the two locally outermost tows $E_0$ at any position along the path of a multi-weft stack $S_E$ defines a binding number of the stack $S_E$. As described for the warp stack $S_A$ above, along the path of each weft stack $S_E$ there is a plurality of transverse stack positions corresponding to intersections with the plurality of warp stacks $S_A$. The weft stack has an embedded taper structure, by which one or more respective embedded (weft) tows $E_1$, $E_2$ have a terminal portion disposed between two locally outermost tows $E_0$ which terminates at a taper position as described above. The respective embedded tows $E_1$, $E_2$ have an end at the taper position, or the respective terminal portion is adjacent to a lead-out portion of the embedded tow which extends past one of the locally outermost tows to exit the multi-layer weave for trimming.

Figure 6A:
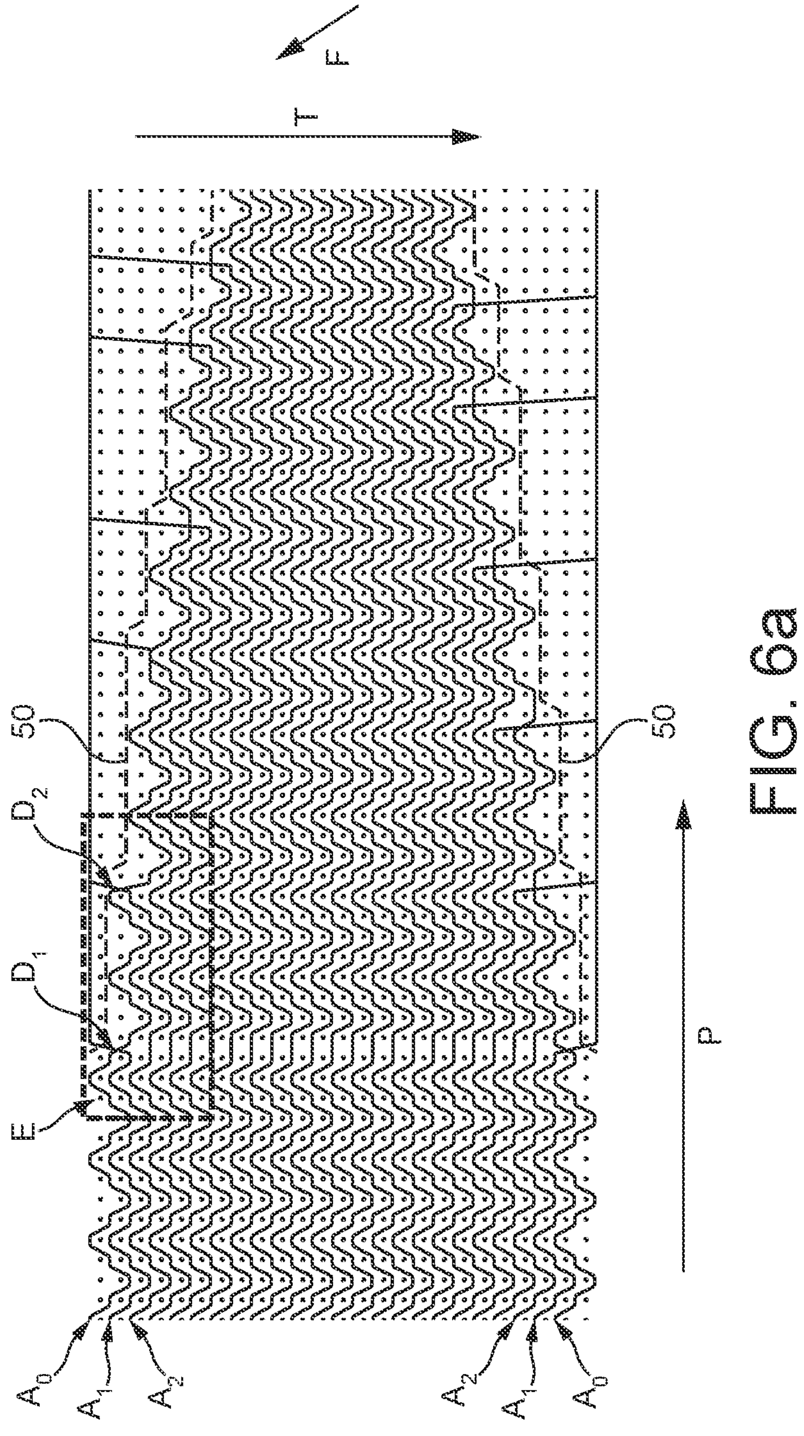
FIGS. 6*a* and 6*b* schematically show regions of an example woven structure.
Figure 6B:
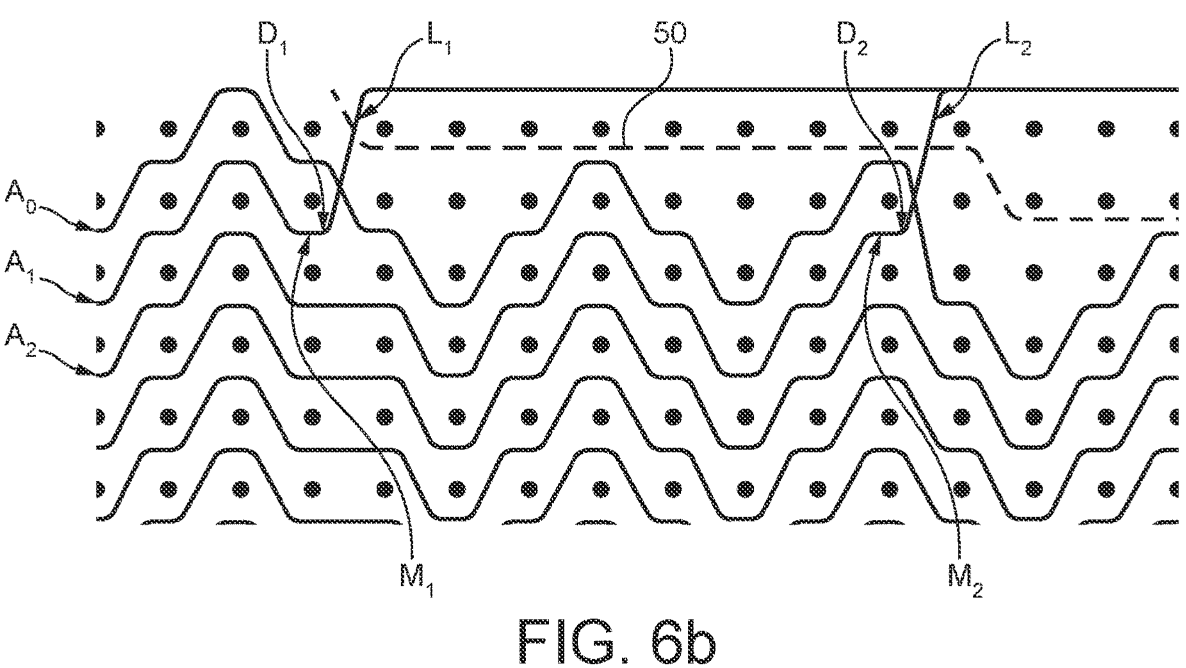

The stacks of FIGS. 4*a*-4*c* and 5*a*-5*c* are non-binding stacks S, however it will be appreciated that similar principles of embedded taper structures apply to binding warp stacks as shown in FIGS. 6*a* and 6*b*, and similarly to weft stacks in which the weft tows are interlaced with warp stacks to have a binding effect.

The weave pattern of the binding warp stack in FIGS. 6*a* and 6*b* is a layer-to-layer angle interlock weave comprising a plurality of warp tows $A_0$, $A_1$, $A_2$, again having outermost tows $A_0$ and embedded tows $A_1$, $A_2$, as described above. It will be appreciated that other binding weave patterns may be used. As above, a trim boundary 50 is shown in FIGS. 6*a* and 6*b*.

Figure 7:
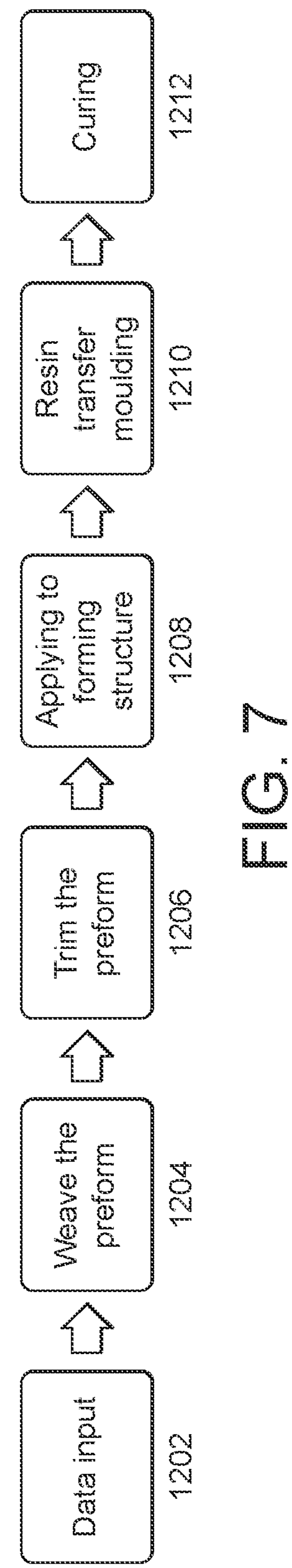
FIG. 7 schematically shows an example method of forming a woven structure.

A method 1200 of forming a component comprising a woven structure as described above will now be described in greater detail with reference to FIG. 7.

In a first step 1202, weave data is input to a loom controller of a loom to be used for weaving the multilayer woven preform, including one or more stacks having an embedded taper structure as described above. The weave data may comprise model data and/or instructions for conducting a weaving operation, such as weave types for respective stacks and portions of the preform. The weave data may include details of the embedded taper structure, for example, data regarding a depth of an embedded tow which is to exit the multi-layer weave, and a taper position D along the respective path of the stack.

In a second step 1204, the loom conducts the weaving operation to weave the preform according to the weave data.

By conducting the weaving operation, the loom is controlled to cause, for each embedded tow, a lead-out portion L to extend past one of the locally outermost tows to exit the multi-layer weave. Controlling the lead-out portion L of the embedded tow to exit from the embedded taper structure comprises moving the lead-out portion L of the embedded tow past one of the locally outermost tows. For example, if the embedded tow is a warp tow A, moving the lead-out portion L of the embedded tow $A_1$, $A_2$ past one of the locally outermost tows $A_0$ may comprise crossing the embedded tow $A_1$, $A_2$ with the locally outermost tow $A_0$ in a reed space for the stack $S_A$ of a loom by raising or lowering the lead-out portion L of the embedded tow $A_1$ $A_0$. In the case of an embedded weft tow $E_1$, $E_2$ moving the lead-out portion L of the embedded tow $E_1$, $E_2$ past one of the locally outermost tows $E_0$ may comprise controlling a rapier carrying the embedded tow $E_1$, $E_2$ to move the lead-out portion L past the locally outermost tow $E_0$.

In step 1206, the woven preform from the loom is trimmed to the required shape along the respective trim boundaries. Trimming may be carried out in a single action, such as by a cutting press. It will be appreciated that after the trimming step, any lead-out portions of the embedded tows may retract into the embedded taper structure.

In step 1208, the woven preform may be applied to a forming structure to adopt a near net shape for the component. The woven preform and forming structure may then be placed in a sealing structure or mould for resin transfer moulding.

In a step 1210, the mould is closed and resin is infused around the preform. A curing process is conducted at elevated pressure and temperature in step 1212 to form the composite component. After curing and subsequent removal from the sealing structure and the forming structure, the component (i.e., in these examples the vane) may be subject to any finishing processing (e.g., machining) as required to adopt the net shape of the component.

We claim:

1. A woven structure formed by warp and weft tows of fiber reinforcement material, comprising:

a plurality of warp stacks, each elongate along a path corresponding to a longitudinal direction of the woven structure; wherein the warp stacks are adjacent one another along a lateral direction of the woven structure, each of the warp stacks comprising at least one warp tow which is elongate along the respective path, and one or more of the warp stacks is a multi-warp stack, the multi-warp stack comprising a plurality of warp tows which are in superposition along a longitudinal extent of the warp stack, thereby defining a superposed region of the multi-warp stack;

a plurality of weft stacks, each elongate along a path transverse to the warp stacks; wherein the weft stacks are longitudinally-adjacent to each other, each of the weft stacks comprising at least one weft tow which is elongate along the respective path, and some of the plurality of weft stacks are multi-weft stacks, each of the multi-weft stacks comprising a plurality of weft tows which are in superposition along the stack, thereby defining a superposed region of the multi-weft stack; wherein the warp tows and the weft tows of the respective stacks are woven in a multi-layer weave;

one or more of the multi-warp stacks and/or one or more of the multi-weft stacks has an embedded taper structure comprising:

an embedded tow which has a terminal portion disposed between two locally outermost tows of the respective stack in the superposed region, the terminal portion terminating at a taper position along the respective path of the stack;

the embedded tow has an end that is interior to the embedded taper structure at the taper position.

2. The woven structure according to claim 1, wherein along the path of each multi-warp stack, two locally outermost tows of the stack bind one or more weft tows of respective warp stacks therebetween, the number of weft tows bound between the two locally outermost tows at any position along the path of a multi-warp stack defining a binding number of the stack; and/or along the path of each multi-weft stack, two locally outermost tows of the stack bind one or more warp tows of respective weft stacks therebetween, the number of warp tows bound between the two locally outermost tows at any position along the path of a multi-weft stack defining the binding number of the stack.

3. The woven structure according to claim 2, wherein for the stack having the embedded taper structure:

the binding number of the stack varies along the path of the stack having the embedded taper structure local to the taper position.

4. The woven structure according to claim 2, wherein for each of the stacks having the embedded taper structure:

the binding number of the stack reduces along the path within two transverse stack positions of the taper position.

5. The woven structure of claim 2, wherein for each of the stacks having the embedded taper structure, two tows of the respective stack continuously define the locally outermost tows of the superposed region over the or each portion of the path in which the binding number of the stack reduces local to a taper position.

6. The woven structure according to claim 1, wherein along the path of each of the plurality of warp stacks there is a plurality of transverse stack positions corresponding to intersections with the plurality of weft stacks; and wherein along the path of each of the plurality of weft stacks there is a plurality of transverse stack positions corresponding to intersections with the plurality of warp stacks.

7. The woven structure of claim 1, where one or more of the stacks having the embedded taper structure comprises a plurality of embedded tows with respective taper positions spaced apart along the path of the stack.

8. The woven structure of claim 1, wherein for each of the stacks having the embedded taper structure, two tows of the respective stack continuously define the locally outermost tows of the superposed region over a portion of the path which includes the or each taper position.

9. The woven structure of claim 1, wherein for each of the stacks having the embedded taper structure, two tows of the respective stack continuously define the locally outermost tows of the superposed region throughout the superposed region.

10. The woven structure of claim 1, wherein for each of the stacks having the embedded taper structure, an embedded tow has a depth number indicating the position of the terminal portion relative to a closest of the locally outermost tows, wherein a depth number of one indicates that the terminal portion is adjacent to the respective outermost tow; and for one or more stacks having the embedded taper structure, there is an embedded tow having the depth number of one; and/or for one or more stacks having the embedded taper structure, there is an embedded tow having the depth number of two or more.

11. The woven structure of claim 1, the woven structure is a composite component, or a preform for the composite component.

12. A non-transitory computer-readable medium comprising model data for a woven structure as defined in claim 1.

13. A method for manufacturing a composite component, comprising:

weaving a multi-layer woven preform for the component from warp and weft tows of fiber-reinforcement material, so that the woven preform comprises:

a plurality of warp stacks, each elongate along a path corresponding to a longitudinal direction of the woven preform; wherein the warp stacks are adjacent one another along a lateral direction of the woven structure, each of the warp stacks comprising at least one warp tow which is elongate along the respective path, and one or more of the warp stacks is a multi-warp stack, the multi-warp stack comprising a plurality of warp tows which are in superposition along a longitudinal extent of the warp stack, thereby defining a superposed region of the multi-warp stack;

a plurality of weft stacks, each elongate along a path transverse to the warp stacks; wherein the weft stacks are longitudinally-adjacent to each other, each of the weft stacks comprising at least one weft tow which is elongate along the respective path, and some of the plurality of weft stacks are multi-weft stacks, each of the multi-weft stacks comprising a plurality of weft tows which are in superposition along the stack, thereby defining a superposed region of the multi-weft stack; wherein weaving the multi-layer woven preform comprises weaving the warp tows and the weft tows of the respective stacks in a multi-layer weave:

wherein one or more of the multi-warp stacks and/or one or more of the multi-weft stacks has an embedded taper structure comprising:

an embedded tow which has a terminal portion between two locally outermost tows of the respective stack in the superposition region, the terminal portion terminating at a taper position along the respective path of the stack;

the embedded tow has an end that is interior to the embedded taper structure at the taper position.

14. A method according to claim 13, further comprising, conducting a resin infusion operation on the woven preform; and/or conducting a forming operation to cure the woven preform; so that the tows are embedded in a composite matrix.

15. A non-transitory computer-readable medium comprising instructions which, when executed by a processor, are configured to cause a performance of a method in accordance with claim 13.

16. A woven structure formed by warp and weft tows of fiber reinforcement material, comprising:

a plurality of warp stacks, each elongate along a path corresponding to a longitudinal direction of the woven structure;

the warp stacks are adjacent one another along a lateral direction of the woven structure, each of the warp stacks comprising at least one warp tow which is elongate along the respective path, and one or more of the warp stacks is a multi-warp stack, the multi-warp stack comprising a plurality of warp tows which are in superposition along a longitudinal extent of the warp stack, thereby defining a superposed region of the multi-warp stack;

a plurality of weft stacks, each elongate along a path transverse to the warp stacks; wherein the weft stacks are longitudinally-adjacent to each other, each of the weft stacks comprising at least one weft tow which is elongate along the respective path, and some of the plurality of weft stacks are multi-weft stacks, each of the multi-weft stacks comprising a plurality of interlaced weft tows which are in superposition along the stack, thereby defining an interlaced region of the multi-weft stack; wherein the warp tows and the weft tows of the respective stacks are woven in a multi-layer weave;

one or more of the multi-warp stacks and/or one or more of the multi-weft stacks has an embedded taper structure comprising:

an embedded tow which has a terminal portion between two locally outermost tows of the respective stack in the interlaced region, the terminal portion terminating at a taper position along the respective path of the stack;

wherein the embedded tow has an end at the taper position; or wherein the terminal portion is adjacent to a lead-out portion of the embedded tow which extends past one of the locally outermost tows to exit the multi-layer weave for trimming.

17. The woven structure according to claim 16, wherein the lead-out portion of the embedded tow is at the same transverse stack position along the path as the taper position.

* * * * *